United States Patent [19]
Garzon

[11] Patent Number: 5,933,308
[45] Date of Patent: Aug. 3, 1999

[54] ARCING FAULT PROTECTION SYSTEM FOR A SWITCHGEAR ENCLOSURE

[75] Inventor: Ruben D. Garzon, Brentwood, Tenn.

[73] Assignee: Square D Company, Palatine, Ill.

[21] Appl. No.: 08/974,254

[22] Filed: Nov. 19, 1997

[51] Int. Cl.⁶ ........................................ H02H 3/00
[52] U.S. Cl. ................................ 361/62; 361/5
[58] Field of Search ............... 361/1, 2, 5, 8, 361/13, 58, 78, 86, 87, 88, 91, 93, 62–64, 95, 99, 100, 134, 138, 115, 117, 131, 42, 54, 57; 335/210

[56] References Cited

U.S. PATENT DOCUMENTS

| | | | |
|---|---|---|---|
| 2,971,130 | 2/1961 | Diebold | 317/16 |
| 3,868,549 | 2/1975 | Schaefer et al. | 317/11 E |
| 4,130,850 | 12/1978 | Cronin et al. | 361/54 |
| 4,295,021 | 10/1981 | Asinovsky et al. | |
| 4,347,414 | 8/1982 | Headley et al. | |
| 4,355,220 | 10/1982 | Parry | |
| 4,369,364 | 1/1983 | Kuntermann | |
| 4,539,448 | 9/1985 | Schulz | |
| 4,631,621 | 12/1986 | Howell | 361/13 |
| 4,697,055 | 9/1987 | Walter et al. | |
| 4,723,187 | 2/1988 | Howell | 361/13 |
| 4,835,648 | 5/1989 | Yamauchi | 361/14 |
| 4,878,144 | 10/1989 | Nebon | 361/96 |
| 5,574,624 | 11/1996 | Rennie et al. | |

*Primary Examiner*—Richard T. Elms
*Assistant Examiner*—Kim Huynh
*Attorney, Agent, or Firm*—Larry I. Golden; Kareem M. Irfan

[57] ABSTRACT

An arcing fault protection system for a switchgear enclosure includes a grounding device for rapidly grounding the source bus of an electrical distribution system in response to the detection of arcing faults in the system. The grounding device, which may comprise a mechanical switch, a solid-state switch or hybrid device, quickly diverts current carried on the source bus to ground to effectively extinguish arcing fault currents present in the distribution system, preventing the generation of gases at hazardous pressures and/or temperatures so as to protect the switchgear equipment from damage and to prevent injury to operating personnel.

3 Claims, 5 Drawing Sheets

ARCING FAULT PROTECTION SYSTEM FOR A SWITCHGEAR ENCLOSURE

FIELD OF THE INVENTION

The present invention relates generally to protective devices for electrical switchgear and, more particularly, to the protection of electrical switchgear from arcing fault currents.

BACKGROUND OF THE INVENTION

Switchgear enclosures are commonly employed in electrical power distribution systems for enclosing circuit breakers and switching equipment associated with the distribution system. Typically, switchgear enclosures are comprised of a number of individual stacked or adjacent compartments, each of the switchgear compartments receiving electrical power from a power source and distributing the electrical power through a feeder circuit to one or more loads. Generally, each of the switchgear compartments includes circuit breakers for interrupting electric power in a particular feeder circuit in response to hazardous current overloads in the circuit.

In addition to current overloads, the switchgear enclosure may encounter other hazardous conditions known as arcing faults. Arcing faults occur when electric current "arcs" or flows through ionized gas between conductors, between two ends of broken or damaged conductors, or between a conductor and ground in the switchgear enclosure. Arcing faults typically result from corroded, worn or aged wiring or insulation, loose connections and electrical stress caused by repeated overloading, lightning strikes, etc. Particularly in medium- to high-voltage power distribution systems, the ionized gas associated with arcing faults may be released at pressures and temperatures sufficient to severely damage or destroy the switchgear equipment and/or cause severe burning injuries or death to operating personnel.

Presently, the most commonly employed method for enhancing the safety and durability of switchgear enclosures in the event of arcing faults is to provide arc-resistant metal switchgear compartments with a means for venting the gases from the compartments in the event of an arcing fault. These compartments are designed to withstand the pressures and temperatures of the gases associated with an arcing fault and reduce the likelihood or extent of damage to switchgear equipment by preventing the gases from entering adjacent switchgear compartments. Safety to operating personnel is enhanced by channeling and venting the hot gases away from operating personnel. However, because these systems do not eliminate the generation and release of hot gases associated with arcing faults, they do not completely eliminate the risk of injury to operating personnel and/or damage to the switchgear equipment.

Accordingly, there is a need for a system of protecting switchgear enclosures and operating personnel from arcing fault hazards in a manner which reduces or eliminates the generation of ionized gases at high temperatures and pressures. The present invention is directed to addressing this need.

SUMMARY OF THE INVENTION

In accordance with one aspect of the present invention, there is provided an arcing fault protection system for a switchgear enclosure accommodating a plurality of feeder circuits. Each of the feeder circuits is electrically connected to a source bus and carries an electric current through the switchgear enclosure toward one or more loads downstream of the switchgear enclosure. The arcing fault protection system comprises a plurality of arcing fault detectors for monitoring the feeder circuits for the presence of arcing fault currents, means for producing an arcing fault detection signal upon detecting arcing fault currents in any of the feeder circuits, and a grounding device for rapidly grounding the source bus in response to the production of an arcing fault detection signal. The grounding of the source bus diverts current carried on the source bus to ground and rapidly eliminates arcing fault currents occurring on any of the feeder circuits. The rapid elimination of arcing fault currents substantially reduces or eliminates the generation of hot gases associated with arcing faults and obviates the need to provide an arc-resistant switchgear enclosure or to vent gases from the enclosure.

In accordance with another aspect of the present invention, the grounding device comprises a mechanical switch rapidly movable from an open position to a closed position. The mechanical switch includes a movable contact and a stationary contact. One of the contacts is electrically connected to the source bus and the other of the contacts is electrically connected to ground. In the open position of the mechanical switch, the movable contact is in a first longitudinal position, apart from the stationary contact. In the closed position of the mechanical switch, the movable contact is in a second longitudinal position, electrically connected to the stationary contact. A latching mechanism comprises a portion of the mechanical switch. The latching mechanism holds the movable contact in the first longitudinal position, defining a latched position, or releases the movable contact from the first longitudinal position, defining an unlatched position, depending on the status of the mechanical switch. A driving mechanism rapidly drives the latching mechanism from the latched position to the unlatched position and accelerates the movable contact toward the second longitudinal position in response to activation of a triggering mechanism.

In one embodiment of the present invention, the latching mechanism includes a latch core oriented adjacent to the driving mechanism, the latch core being movable coincident to the driving mechanism and communicating movement to the movable contact in response to activation of the triggering mechanism. An outer surface of the latch core defines a holding surface and a recessed releasing surface. A stationary latch support is oriented transverse to the latch core and has an inner surface defining a retaining member. A plurality of ball bearings are disposed between the latch core and the latch support. The ball bearings are held into engagement with the retaining member by the holding surface of the latch core when the latching mechanism is in the latched position, and collapse inwardly toward the releasing surface and become released from the retaining member when the latching mechanism is in the unlatched position.

In accordance with still another aspect of the present invention, the grounding device comprises a first and second thyristor connected from the source bus to ground. The first and second thyristors include respective first and second gate terminals responsive to the arcing fault detection signal. The first and second thyristors block current flow from the source bus to ground when the arcing fault detection signal is not applied to their respective gate terminals and permit current flow from the source bus to ground when the arcing fault detection signal is applied to their respective gate terminals.

BRIEF DESCRIPTION OF THE DRAWINGS

In the drawings, which comprise a portion of this disclosure.

DETAILED DESCRIPTION

Figure 1:
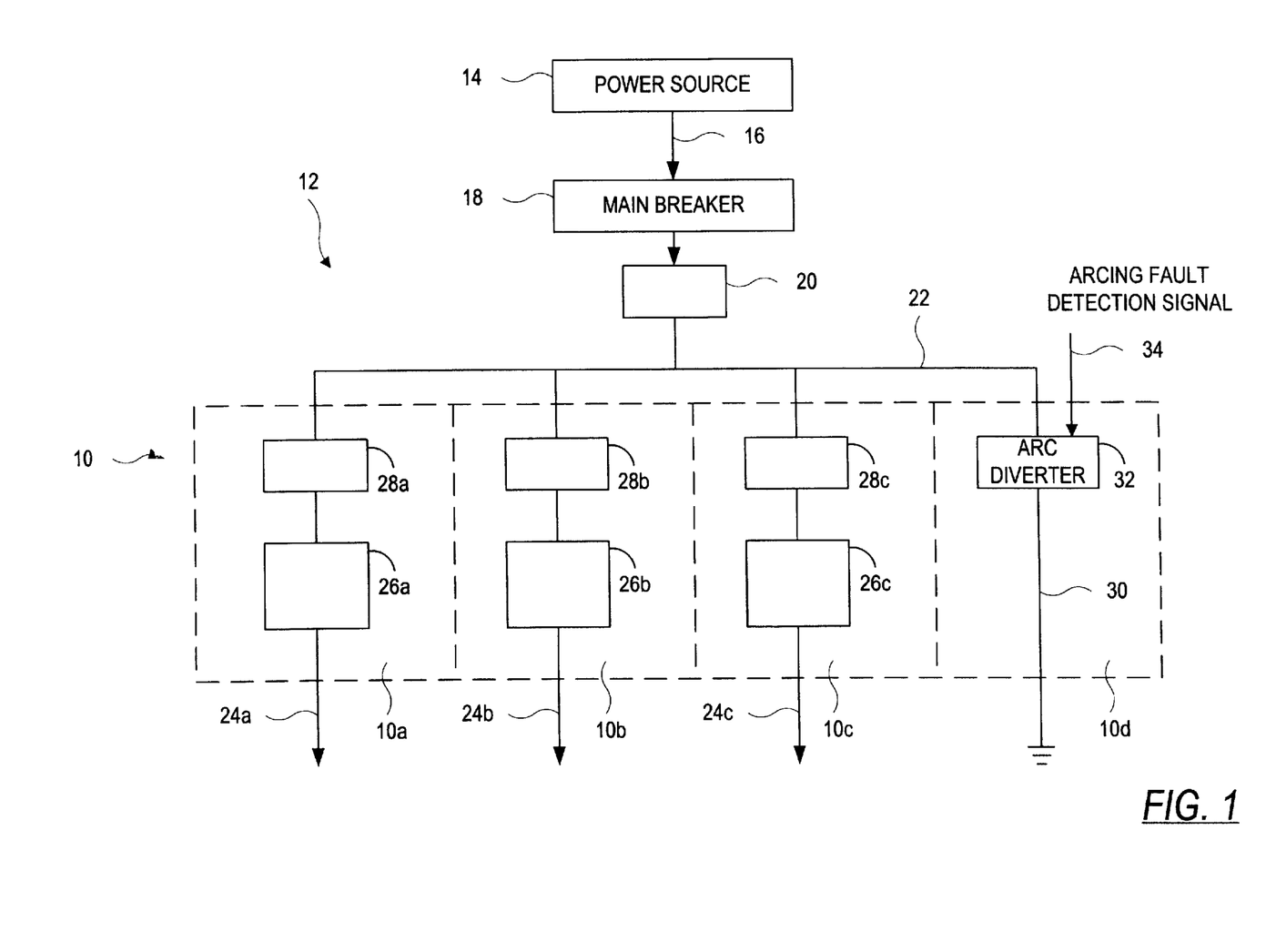
FIG. 1 is a block diagram of an arcing fault protection system for a switchgear enclosure according to one embodiment of the present invention.

Turning now to the drawings and referring first to FIG. 1, there is shown a switchgear enclosure, generally designated by reference numeral 10, including individual compartments 10a, 10b, 10c and 10d for housing various components of an electrical distribution system 12. A power source 14, which may comprise, for example, a utility company power transformer, supplies power for the distribution system 12 through a main circuit 16. The main circuit 16 is typically routed through a main breaker, designated here by reference numeral 18. A current sensor 20 such as a toroidal coil may also be provided for monitoring the main circuit 16 for characteristics of arcing faults, as is known in the art. A source bus 22 connected to main circuit 16 distributes electrical power from the power source 14 to a plurality of feeder circuits 24a, 24b, 24c, each of which is routed through one of the switchgear compartments 10. Each of the feeder circuits 24 typically supplies power to one or more loads (not shown) downstream of the switchgear enclosure 10. It will be appreciated that the number of feeder circuits 24 shown here, as well as the number of switchgear compartments 10, is exemplary only, and may be varied according to the particular type and/or application of the switchgear enclosure 10.

The switchgear enclosure 10 typically includes switching and monitoring equipment associated with the respective feeder circuits 24. For example, in the embodiment shown in FIG. 1, the switchgear enclosure 10 includes a plurality of circuit breakers 26a,b,c and a plurality of optical sensors 28a,b,c. In one embodiment, the circuit breakers 26 and optical sensors 28 comprise devices known in the art which are mounted within the respective switchgear compartments 10a,b,c and are associated with one of the feeder circuits 24a,b,c. The circuit breakers 26 are provided for interrupting electric power in the respective feeder circuits 24 in response to current overloads and the optical sensors are provided for monitoring the respective feeder circuits 24 for the presence of arcing faults. Again, however, it will be appreciated that the electrical components shown here are exemplary only; they may be replaced, eliminated or supplemented with other components, according to the particular type and/or application of the switchgear enclosure.

In accordance with one aspect of the present invention, an arc diverter circuit 30 is connected between the source bus 22 and ground. In the case of an ungrounded (i.e. "delta") system (not shown), the arc diverter circuit 30 is connected between the phase lines of the system. The arc diverter circuit 30 includes an arc diverter 32 which, upon receipt of an arcing fault detection signal 34, quickly connects or "crow-bars" the source bus 22 to ground, thereby extinguishing arcing fault currents which may have occurred on any of the feeder circuits 24 before they are permitted to generate gases at dangerous pressures and/or temperatures. In one embodiment, for example, the arcing fault currents are extinguished in less than about 4 milliseconds, effectively eliminating the generation of dangerous gases associated with the arcing fault. The present system therefore eliminates the need to manufacture the switchgear enclosure 10 according to conventional metal-clad arc-resistant designs or to vent gases from the enclosure 10. As will be described in greater detail hereinafter, the arc diverter 32 may comprise a mechanical switch, solid-state switch or hybrid mechanical and solid-state switch. The arc diverter 32 may be mounted in one of the switchgear compartments, as shown here, or may be mounted in a separate compartment external to the switchgear enclosure 10.

Figure 2:
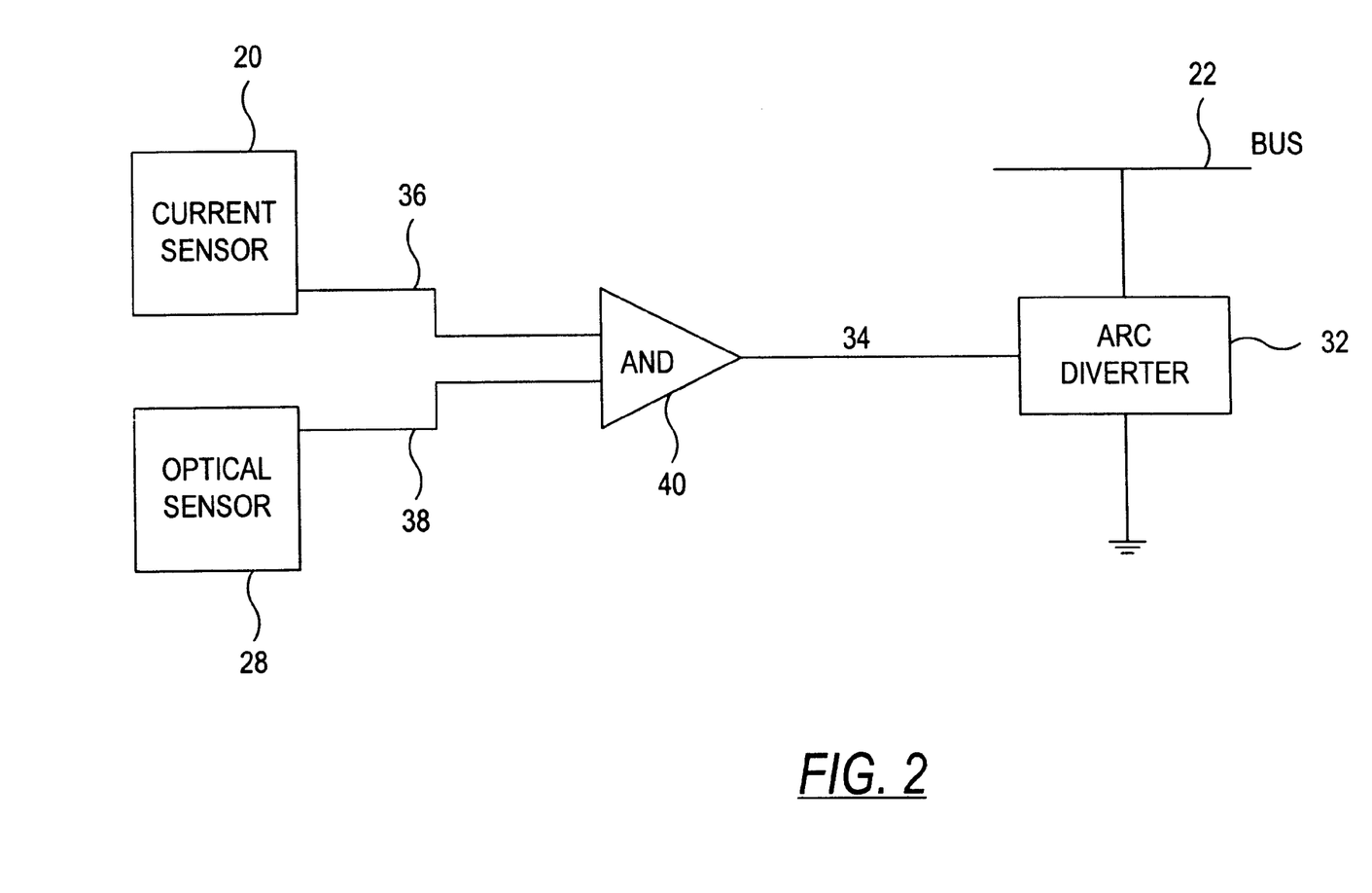
FIG. 2 is a block diagram illustrating a system which may be used to generate an arcing fault detection signal in the system of FIG. 1.

FIG. 2 illustrates one embodiment in which the arcing fault detection signal 34 is generated by a combination of a current sensor 20 monitoring the main circuit 16, and optical sensors 28 monitoring the feeder circuits 24. It will be appreciated, however, that the arcing fault detection signal 34 may be generated by any of several other configurations of sensors including, for example, a system where optical sensors 28 and current sensors 20 are employed in each feeder circuit 24, or a system including only optical sensors or only current sensors.

The current sensor 20 may comprise any type of current sensor known in the art. In one embodiment, the current sensor 20 comprises a coil for monitoring the rate of change of current in main circuit 16 (or, alternatively, in any of the feeder circuits 24). It is known that a coil wound around a current-carrying conductor produces a signal representative of the magnitude or rate of change of current that may be evaluated for characteristics of arcing faults. One such system is described, for example, in U.S. patent application Ser. No. 08/600,512, assigned to the assignee of the present invention and incorporated herein by reference. The current sensor 20 produces an arcing fault detection signal, designated in FIG. 2 by reference numeral 36, if it determines that an arcing fault is present on the main circuit 24 (or feeder circuit 24).

The optical sensors 28 may comprise any type of optical sensor known in the art such as, for example, the optical sensor described in U.S. Pat. No. 4,369,364 and commercially available from BBC Brown, Boveri & Company Limited, Baden, Switzerland. The optical sensors 28 are sensitive to light impulses representing the occurrence of arcing faults within the switchgear enclosure 10 and produce an arcing fault detection signal, designated in FIG. 2 by reference numeral 38, if they determine that an arcing fault is present on any of the feeder circuits 24.

In one embodiment, the respective arcing fault detection signals 36,38 are fed to an AND gate 40, which produces a consolidated arcing fault detection signal 34 to trigger arc diverter 32 only when arcing fault detection signals are provided by both the current sensor 20 and optical sensor 28. This arrangement minimizes the chance that switching will occur due to "false" signals because it is unlikely that false signals will be detected by both the current sensor 20 and the optical sensor 28.

In one embodiment of the present invention, the arc diverter 32 in the system of FIG. 1 comprises a mechanical switch for rapidly shorting or "crow-barring" the source bus 22 to ground in response to the receipt of an arcing fault detection signal 34. The mechanical switch may consist of a standard, commercially available vacuum interrupter 52, also known as a "vacuum bottle," such as the one shown in FIG. 3. The vacuum interrupter 52 is oriented generally about a longitudinal axis 65 and comprises a cylindrical chamber 54 for housing a movable contact 56 and a stationary contact 58. Alternatively or additionally, the vacuum interrupter 52 may include a set of contacts immersed in an insulating medium such as, but not limited to, sulfurhexaflouride gas ($SF_6$) or oil.

Figure 3:
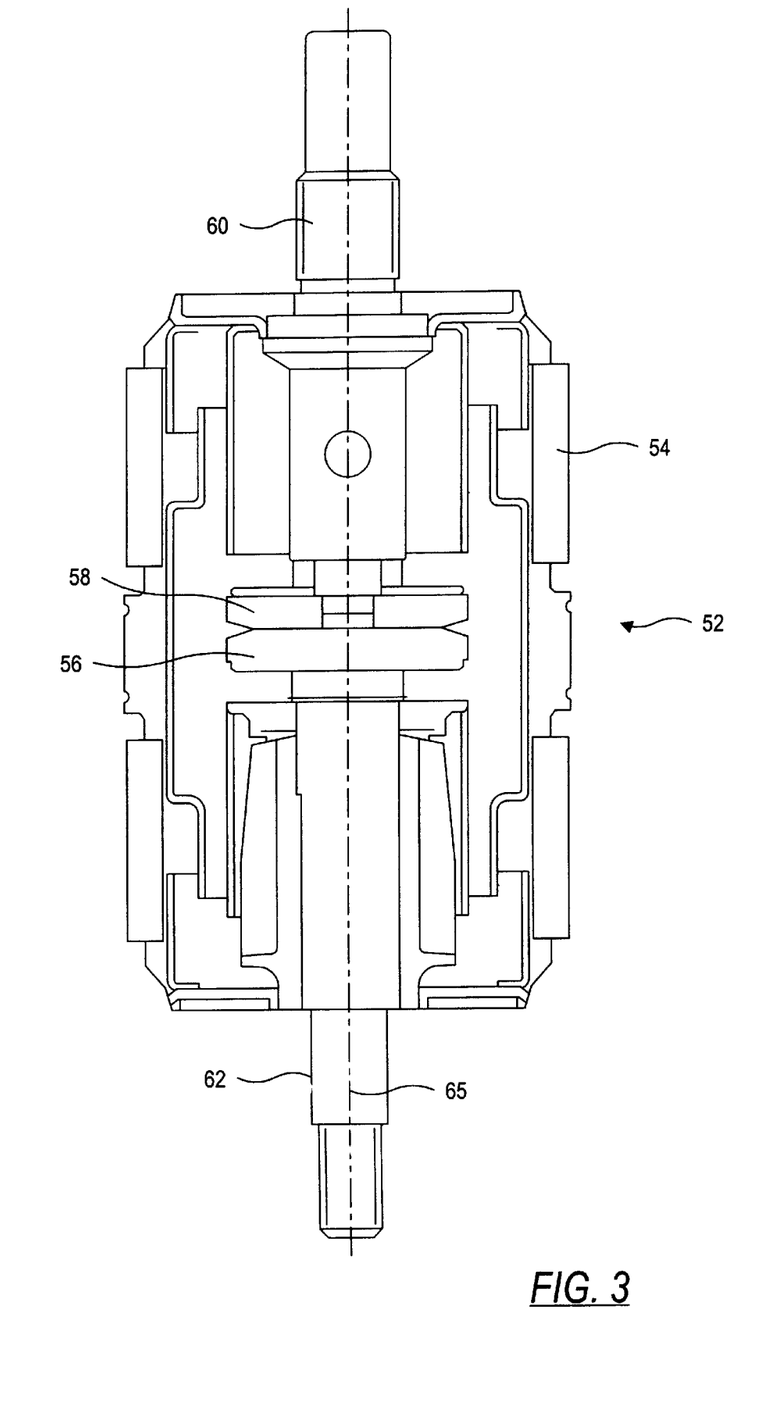
FIG. 3 is a side sectional view of a prior art vacuum interrupter which forms a portion of a mechanical switch which may be used in the system of FIG. 1.

The stationary contact 58 is electrically connected to the source bus 22 (FIG. 1) by a connecting rod 60. The movable contact 56 is connected via a connecting rod 62 to a driving mechanism, which will be described in detail in relation to FIG. 4. Normally, in the absence of an arcing fault detection signal, the movable and stationary contacts 56,58 are separated, defining an open position of the vacuum interrupter 52. As shown in FIG. 3, the movable and stationary contacts 56,58 are engaged, defining a closed position of the vacuum interrupter 52 in which the source bus 22 is shorted to ground.

According to one aspect of the present invention, the closing of the vacuum interrupter 52 accomplished very rapidly so as to effectively eliminate the generation of dangerous gases associated with arcing faults. More specifically, the movable contact 56 is rapidly moved toward the stationary contact 58, from a first longitudinal position in which the movable contact 56 is separated from the stationary contact 58 (i.e., in the open position of the vacuum interrupter 52), to a second longitudinal position in which the movable contact 56 is engaged with and electrically connected to the stationary contact 58 (i.e., in the closed position of the vacuum interrupter 52). Preferably, the closing of the switch is accomplished in less than about 4 milliseconds.

Figure 4:
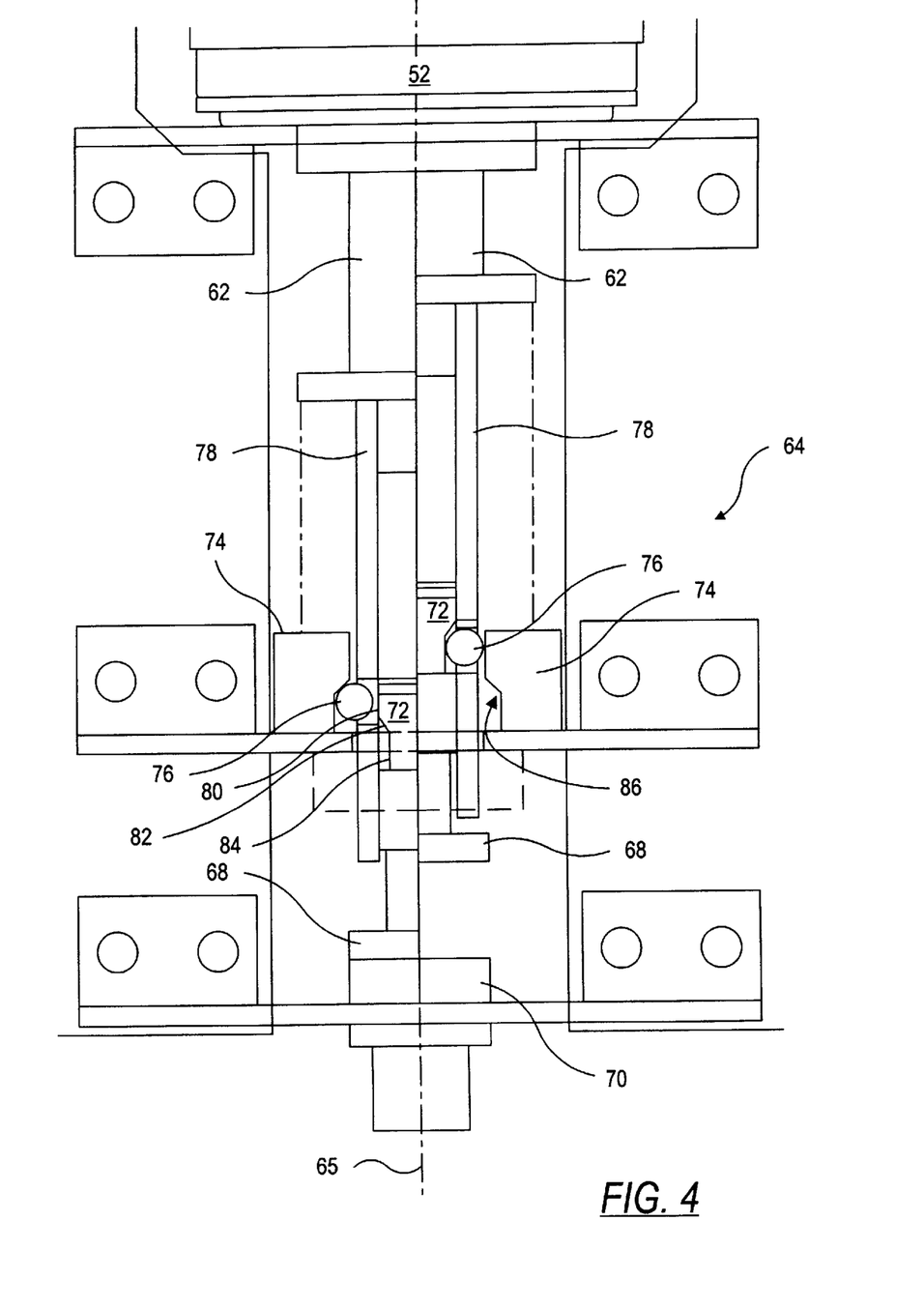
FIG. 4 is a side sectional view of another portion of a mechanical switch which may be used in conjunction with the vacuum interrupter of FIG. 3, illustrating both an open and closed position of the mechanical switch.

FIG. 4 illustrates a structure, designated by reference numeral 64, that may be used to drive the movable contact 56 into engagement with stationary contact 58 according to one embodiment of the present invention. The structure 64 is oriented generally about longitudinal axis 65 and aligned with the vacuum interrupter 52. The left-hand half of FIG. 4 shows the structure 64 as it would appear when the vacuum interrupter 52 is in an open position, in the absence of an arcing fault detection signal 34. The right-hand half of FIG. 4 shows the structure 64 as it would appear when the mechanical switch 50 is in a closed position, after having shorted or "crow-barred" the source bus 22 to ground in response to receipt of an arcing fault detection signal 34.

The structure 64 consists generally of a latching mechanism 66, a driving mechanism 68 and a triggering mechanism 70. The latching mechanism 66 includes a latch core 72, a latch support 74 and a plurality of ball bearings 76 disposed between the latch core 72 and the latch support 74. A piston 78 is positioned between the latching mechanism 66 and the connecting rod 62. Generally, the driving mechanism 68, latch core 72, ball bearings 76 and piston 78 are adapted for rapid upward movement along longitudinal axis 65 when the vacuum interrupter 52 is actuated by the triggering mechanism 70, as will be described in detail hereinafter, to drive the movable contact 56 into engagement with the stationary contact 58.

The outward-facing surface of the latch core 72 includes a holding surface 80, an inclined surface 82 and a recessed surface 84. The inward-facing surface of the latch support 74 includes a retaining groove 86. The ball bearings 76 are adapted to move in both longitudinal and transverse directions relative to the latch core 72 and latch support 74, depending on the operational status of the latching mechanism 66. In the left-hand side of FIG. 4, the latching mechanism 66 is shown in a latched position, in which the ball bearings 76 are held between the retaining groove 86 of the latch support 74 and the holding surface 80 of the latch core 72. In this position, the piston 78 (and hence connecting rod 62 and movable contact 56) is restrained from longitudinal movement, maintaining the vacuum interrupter 52 in the open position.

In the right-hand side of FIG. 4, the latching mechanism 66 is shown in an unlatched position, in which the piston 78 (and hence movable contact 56) is released and permitted to move along longitudinal axis 65 toward the stationary contact 58. The release of the latching mechanism 66, e.g., from the latched position to the unlatched position, occurs in response to upward movement of the latch core 72. More specifically, when the latch core 72 is moved upwardly along the longitudinal axis 65, the holding surface 80 of the latch core 72 is advanced beyond the longitudinal position of the ball bearings 76, causing the ball bearings 76 to collapse inwardly toward the recessed surface 84 of the latch core 72. The inward movement of the ball bearings 76 causes them to become released from the retaining groove 86 of latch support 74, thereby "unlatching" the latching mechanism and permitting the vacuum interrupter 52 to move toward its closed position.

The driving mechanism 68 is a cylindrical disk oriented about the longitudinal axis 65 and adjacent to a bottom surface of the latch core 72. In one embodiment, the driving mechanism 68 comprises a metal disk, but it will be appreciated that other materials may be employed. The driving mechanism 68 is adapted for rapid upward movement along the longitudinal axis 65, in response to production of an accelerating force by the triggering mechanism 70. The driving mechanism 68, in conjunction with triggering mechanism 70, must accordingly be capable of developing significant velocities over a short distance. For example, in one embodiment, it is expected that the closing of vacuum interrupter 52 will be accomplished in two to four milliseconds. Assuming a travel distance of about 8 to 10 mm, (corresponding to the typical distance between movable and stationary contacts 56,58 in a vacuum interrupter bottle 52 of the type shown in FIG. 3), the driving mechanism 68 must be capable of producing an average velocity of about 4 to 5 meters per second. However, it will be appreciated that this operating speed is exemplary only. The operating speed required for any particular application is dependent on the distance between contacts as well as the pressure and type of insulating medium (if any) between contacts.

In the left-hand side of FIG. 4, the driving mechanism 68 is shown adjacent to the triggering mechanism 70, as it would appear when the vacuum interrupter 52 is open. In the right-hand side of FIG. 4, the driving mechanism is shown as it would appear when the vacuum interrupter 52 is closed, having traveled a distance corresponding to the separation distance of the movable and stationary contacts 56,58. The upward movement of the driving mechanism 68 causes corresponding movement of latch core 72, causing a release of latching mechanism 66 and ultimately closing the vacuum interrupter 52. As stated previously, closing of the vacuum interrupter 52 quickly extinguishes any arcing fault currents present in the distribution system, by rapidly shorting or "crow-barring" the source bus 22 to ground.

In one embodiment, the triggering mechanism 70 comprises a flat (pancake-type) radially wound coil having a face located adjacent to the driving mechanism 68. Generally, the coil 70 is connected to an energy source (not shown) which is energized in response to production of an arcing fault detection signal by the protection system. In one embodiment, the energy source comprises a bank of capacitors charged to a voltage in the range of hundreds or thousands of volts, depending on the particular application or rating of the mechanical switch. Upon generation of an arcing fault detection signal, energy from the energy source is released into the coil 70, causing an electrical current to be conducted in the coil 70. The presence of electrical current in the coil 70 causes a repulsion force to be produced which is proportional to the number of turns of the coil 70 and the current carried by the coil 70. The repulsion force is directed along the longitudinal axis 65 toward the driving mechanism 68, imparting a high instantaneous acceleration to the driving mechanism 68 and causing a quick release of the latching mechanism 66, in the manner heretofore described. The accelerating force may be supplemented by an additional force associated with the mechanical switch. For example, the supplemental force may be provided by a compressed spring (not shown), or by pneumatic or hydraulic operation of the vacuum interrupter 52.

Now turning to FIGS. 5*a* through 5*d*, there is shown a series of solid-state switches which may be used in the system of FIG. 1. Components common to the various switch embodiments will be designated by common reference numerals throughout, although the different switch embodiments shown in FIGS. 5*a* through 5*d* will be designated by different reference numerals. Generally, each of the respective switch embodiments of FIG. 5*a* through 5*d* includes a pair of thyristors 90,92 connected in parallel between the source bus 22 and ground of an electrical distribution system. Gate terminals of thyristors 90,92, designated respectively by reference numerals 94 and 96, are connected to the AND gate 40 (or, alternatively, directly to the arcing fault sensors 20 or 28) to receive an arcing fault detection signal 34 upon the detection of an arcing fault by the protection system.

Generally, with no arcing fault signal 34 provided to the gate terminals 94,96 (e.g., with no arcing fault having been detected), the thyristors 90,92 are "off" and do not permit current to flow through the thyristor. With an arcing fault signal 34 applied to the gate terminals 94,96, the thyristor is turned "on" and current is permitted to flow through the thyristor, thereby effectively short-circuiting the source bus 22 and extinguishing any arcing fault currents present in the system. Once the thyristors 90,92 begin to conduct electrical current in response to application of the gate signal, the current flow through the thyristors 90,92 does not generally shut off, even if the gate signal is removed, until the current flow is reduced below a threshold level, most likely by the main breaker 18 (FIG. 1) in the distribution system. It will be appreciated, however, that the present invention is not limited to the use of thyristors, but may utilize other forms of solid-state devices such as, for example, insulated-gate bipolar transistors (IGBTs). A system employing IGBTs will operate generally the same as a system employing thyristors, the difference being that current flow through an IGBT is blocked when the gate signal is removed.

Figure 5A:
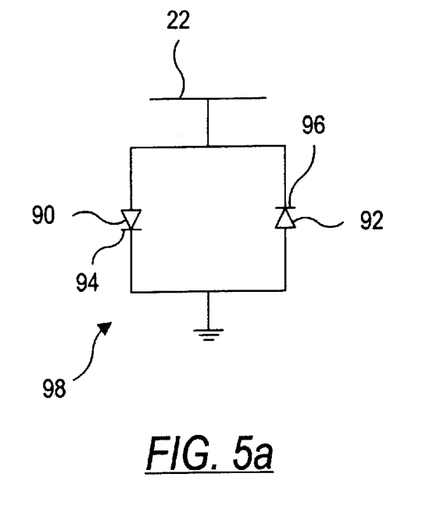
FIGS. 5a through 5d are schematic diagrams of solid-state switches which may be used in the system of FIG. 1.

FIG. 5*a* illustrates a solid-state switch 98 in a basic embodiment including a pair of thyristors 90,92 connected in parallel between the source bus 22 and ground, as heretofore described. With no arcing fault signal 34 provided to the gate terminals 94,96 (e.g., with no arcing fault having been detected), the thyristors 90,92 do not permit current to flow through the thyristor. With an arcing fault signal 34 applied to the gate terminals 94,96, the thyristors conduct electric current from the source bus 22 to ground, thereby short-circuiting the source bus 22 and extinguishing any arcing fault currents present in the system. The thyristors 90,92 are biased in a manner such that the first thyristor 90 begins conducting current from the source bus to ground coincident to a positive half-cyle of alternating electric current on the source bus 22, and the second thyristor 92 begins conducting current from the source bus to ground coincident to a negative half-cyle of alternating electric current on the source bus 22.

Figure 5B:
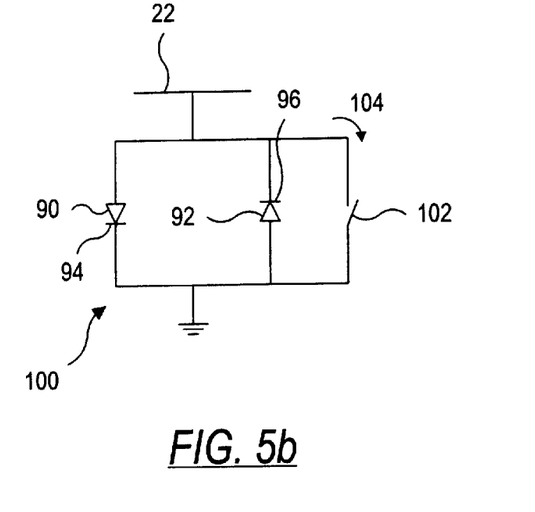

FIG. 5*b* illustrates a solid-state switch 100 according to an alternative embodiment of the present invention. The solid-state switch 100 includes respective thyristors 90,92 having respective gate terminals 94,96 responsive to an arcing fault detection signal, as heretofore described. The solid-state switch 100 further includes a shunt shorting contact 102 connected between the source bus 22 and ground. The shunt shorting contact 102 generally comprises a relatively slow operating switch which is triggered in response to the detection of an arcing fault (e.g., upon receipt of an arcing fault detection signal) to provide an alternate current path 104 from the source bus 22 to ground. In one embodiment, the shunt shorting contact 102 is triggered to provide the alternate conducting path 104 before the thyristors 90,92 have conducted for more than about one half-cyle of alternating electric current. This is an advantageous feature because typical thyristors are rated to withstand high currents for no more than about one half-cycle. The provision of shunt shorting contact 102 prolongs the operable life of the thyristors 90,92 because it decreases the likelihood that the high current rating of the thyristors 90,92 will be exceeded.

Figure 5C:
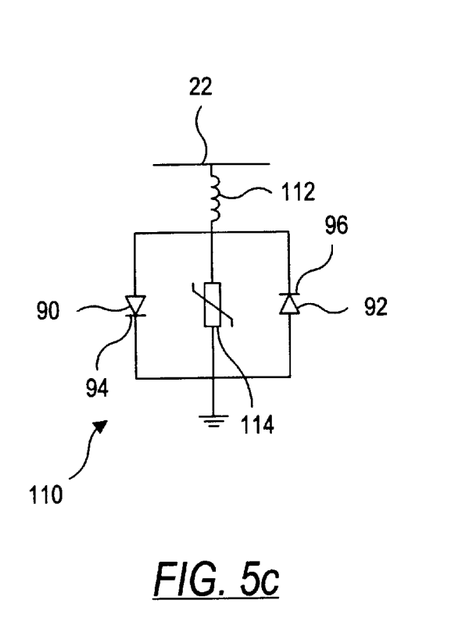

FIG. 5*c* illustrates a solid-state switch 110 according to another alternative embodiment of the present invention. The solid-state switch 110 includes respective thyristors 90,92 having respective gate terminals 94,96 responsive to an arcing fault detection signal, as heretofore described. To protect the thyristors 90,92 from excess voltages and/or currents, the solid-state switch 110 further includes a current-limiting reactance 112 and a voltage arrestor 114. The current limiting reactance 112 is connected between the source bus 22 and the thyristors 90,92 so that, when the thyristors 90,92 are conducting, the current flowing through the respective thyristors 90,92 is limited, preferably to a level that does not exceed the current rating of the thyristors 90,92. Similarly, the voltage arrestor 114 is connected in parallel to the thyristors 90,92 and is designed to clamp the voltage across thyristors 90,92 to a level that does not exceed the rated breakdown voltage of the thyristors 90,92.

Figure 5D:
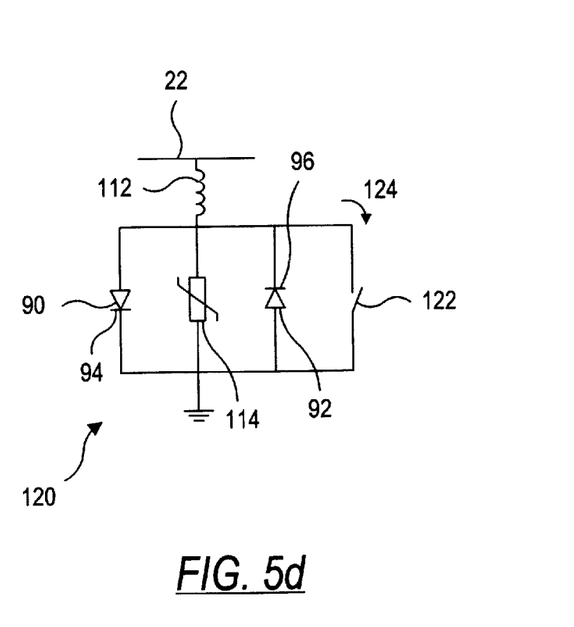

FIG. 5*d* illustrates a solid-state switch 120 according to still another alternative embodiment of the present invention. The solid-state switch 120 includes all of the components of the solid-state switch 110 shown in FIG. 5*c*, with the addition of a shunt shorting contact 122. The shunt shorting contact 122 serves substantially the same function as the shunt shorting contact 102 described in relation to FIG. 5*b*, providing an alternate conducting path 124 for the current flowing between the source bus 22 and ground. Preferably, the shunt shorting contact 122 is triggered to provide the alternate conducting path 124 before the thyristors 90,92 have conducted for more than about one half-cyle of alternating electric current, for the reasons heretofore described in relation to FIG. 5*b*.

It will be appreciated that any of the solid-state switches described in relation to FIGS. 5*a* through 5*d* may be used in combination with a mechanical switch, such as that described in relation to FIGS. 3 and 4, to define a hybrid solid-state and mechanical arc diverter circuit 30 in the system of FIG. 1.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. An arcing fault protection system for a switchgear enclosure accommodating a plurality of feeder circuits, each of said feeder circuits being electrically connected to a source bus and carrying an electric current through said switchgear enclosure toward one or more loads downstream of said switchgear enclosure, said source bus being connected to a power source through a main circuit, said switchgear enclosure including a plurality of compartments for housing electrical components associated with said feeder circuits, said arcing fault protection system comprising:

a current sensor for monitoring said main circuit for the presence of arcing fault currents;

a plurality of optical sensors for monitoring said feeder circuits for the presence of arcing fault currents;

means for producing an arcing fault detection signal in response to said current sensor detecting said arcing fault currents in said main circuit and at least one of said optical sensors detecting said arcing fault currents in an associated one of said feeder circuits; and a grounding device for rapidly grounding said source bus in response to the production of an arcing fault detection signal by said protection system, the grounding of said source bus diverting current carried on said source bus to ground and rapidly eliminating arcing fault currents occurring on any of said feeder circuits.

2. An arcing fault protection system for a switchgear enclosure accommodating a plurality of feeder circuits, each of said feeder circuits being electrically connected to a source bus and carrying an electric current through said switchgear enclosure toward one or more loads downstream of said switchgear enclosure, said switchgear enclosure including a plurality of compartments for housing electrical components associated with said feeder circuits, said arcing fault protection system comprising:

a plurality of arcing fault detectors for monitoring said feeder circuits for the presence of arcing fault currents;

means for producing an arcing fault detection signal upon detecting said arcing fault currents in an associated one of said feeder circuits; and a grounding device comprising a mechanical switch rapidly movable from an open position to a closed position for rapidly grounding said source bus in response to the production of an arcing fault detection signal by said protection system, the grounding of said source bus diverting current carried on said source bus to ground and rapidly eliminating arcing fault currents occurring on any of said feeder circuits, the mechanical switch comprising:

a movable contact and a stationary contact, one of said movable and stationary contacts being electrically connected to said source bus, the other of said movable and stationary contacts being electrically connected to ground, said movable contact being movable from a first longitudinal position apart from said stationary contact and defining said open position of said mechanical switch to a second longitudinal position electrically connected to said stationary contact and defining said closed position of said mechanical switch;

a latching mechanism movable between a latched position and an unlatched position, said latching mechanism holding said movable contact in said first longitudinal position when in said latched position, said latching mechanism releasing said movable contact from said first longitudinal position when in said unlatched position;

a driving mechanism comprising a repulsion disk oriented about a longitudinal axis, said repulsion disk rapidly advancing along said longitudinal axis and communicating movement of said movable contact toward said stationary contact in response to production of an accelerating force by said triggering mechanism, said latching mechanism being driven from said latched position to said unlatched position and said movable contact being accelerated toward said second longitudinal position in response to production of said accelerating force; and a triggering mechanism comprising a radially wound coil adjacent to said repulsion disk for producing said accelerating force and triggering movement of said repulsion disk in response to production of an arcing fault detection signal by said protection system, said coil being connected to an energy source and adapted to conduct an electric current in response to activation of said energy source, the coil producing said accelerating force in response to conducting said electric current.

3. The protection system of claim 2 wherein said latching mechanism comprises:

a latch core oriented about said longitudinal axis and adjacent to said repulsion disk, said latch core being movable coincident to said repulsion disk along said longitudinal axis and communicating movement to said movable contact in response to production of said accelerating force by said triggering mechanism, said latch core having an outer surface defining a holding surface and a recessed releasing surface;

a latch support oriented transverse to said latch core and having an inner surface defining a retaining member;

a plurality of ball bearings disposed between said latch core and said latch support, said ball bearings being held into engagement with said retaining member by said holding surface when said latching mechanism is in said latched position, said ball bearings collapsing inwardly toward said releasing surface and becoming released from said retaining member when said latching mechanism is in said unlatched position.

* * * * *